July 2, 1968     H. D. BRIDGES     3,390,410
THREAD SWAGING TAP
Filed May 6, 1966
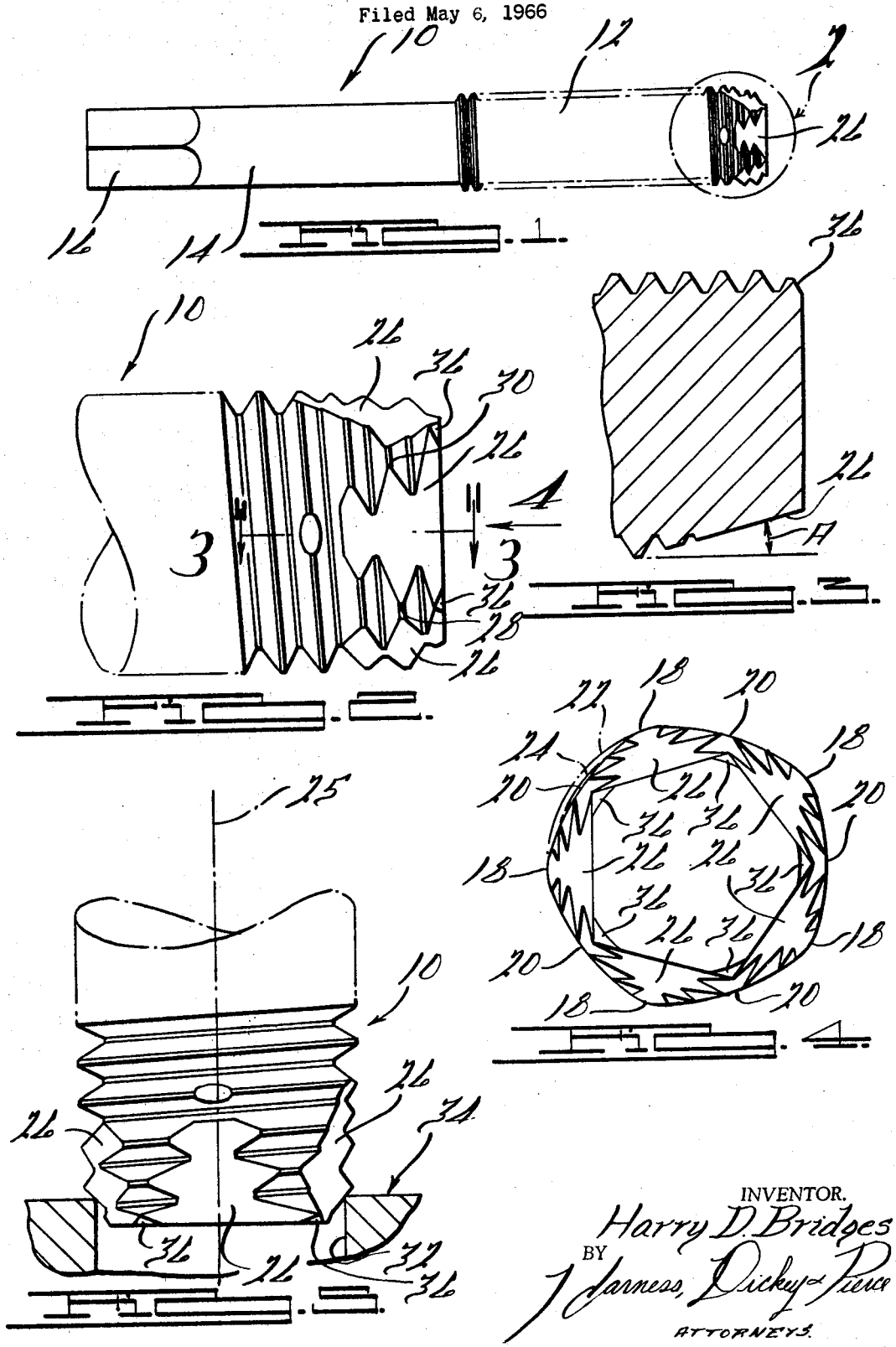
INVENTOR.
Harry D. Bridges
BY
Harness, Dickey & Pierce
ATTORNEYS.

United States Patent Office 3,390,410
Patented July 2, 1968

3,390,410
THREAD SWAGING TAP
Harry D. Bridges, Detroit, Mich., assignor to Detroit Tap & Tool Company, Warren, Mich., a corporation of Delaware
Filed May 6, 1966, Ser. No. 548,270
7 Claims. (Cl. 10—152)

This invention relates generally to thread forming tools and, more particularly, to a new and improved thread swaging tap for forming internal threads in the walls of cylindrical bores.

Recent developments in the production of tapped holes has shown increasingly popular use of forming rather than cutting taps. Such forming or swaging taps produce threads through the plastic flow of material around the periphery of the hole, rather than by material removal as is the case with conventional cutting taps wherein internal threads are generated as small slices or chips of material are removed by successive chamfered teeth on the cutting tap. In the case of blind holes, the chips that are formed during the thread cutting operation accumulate at the bottom of the hole, frequently resulting in clogging the flutes of the tap, with the further result that excessive loading is imposed upon the tap, thus causing frequent breakage thereof.

The majority of the forming taps heretofore known and used are quite different in construction from the aforementioned cutting taps in that the thread diameter at the nose ends of taps have been tapered to permit interference free entrance into the untapped holes. The tapered portion causes the work material to gradually flow into the desired thread form without producing any chips, whereby to obviate the aforementioned loading difficulty which occurs in the case of conventional cutting taps. Forming taps are also desirable from the standpoint that the formed threads are stronger since the grain fibers in the material are unbroken, the material being compacted and work hardened as the threads are formed. Accordingly, the formed or swaged threads exhibit superior holding power.

Although the above described forming taps have overcome a great many of the thread forming problems heretofore encountered by conventional cutting taps, tapered forming taps, as heretofore known and used, have been objectionable in themselves for a number of reasons. First of all, it has been extremely difficult, if not impossible, to produce tapered forming taps wherein the crests of all of the threads are in uniform lead. Such "lead error" has resulted in excessive tap loading, due to binding between the threads being formed, which results in a rough, galled finish on the threads caused by the tap lead error shift that occurs when the tap is backed out of the threaded hole. Another serious disadvantage of the tapered forming taps heretofore known and used resides in the fact that the taps have been relatively expensive to manufacture, due to the compound curvature of the forming threads thereof. Also, at such time as the forming threads become worn, the taps must be either discarded or be subjected to expensive reconditioning operations to reform the threads thereon.

The present invention is directed toward a new and improved thread swaging tap that is constructed so as to overcome all of the aforementioned objectionable features of tapered forming taps heretofore known and used. In particular, the present invention is directed toward a forming tap wherein all of the forming threads are of a uniform diameter, i.e., not tapered, which results in the thread crests being of uniform lead so that no thread binding occurs, with the result that substantially lower torque loading is required and improved size and quality control is exhibited. Another feature of the thread forming tap of the present invention resides in the fact that since there is no taper or the nose end thereof, at such time as the tap becomes worn, the tap may be reversed or, alternatively, economically reconditioned.

The above features are accomplished with a thread forming tap which, in accordance with the principles of the present invention, is formed with a plurality of inclined faces or facets that enable the nose end thereof to be inserted into the hole within which threads are to be formed. The facets are formed on the end of the tap in a manner such that when the taps become worn, the facets may be readily reconditioned by a simple regrinding operation, whereby the taps will again function like new. By virtue of the fact that the taps may be reground several times, production costs will be reduced since the taps may be used to thread a considerably greater number of holes than was heretofore possible with tapered forming taps which have required expensive reworking in the event they became worn.

It is accordingly a primary object of the present invention to provide a new and improved thread forming or swaging tap.

It is another object of the present invention to provide a new and improved swaging tap of the above character wherein all of the thread forming crests are in uniform lead, resulting in lower torque requirements, improved size control and smoother threads.

It is another object of the present invention to provide a new and improved thread swaging tap of the above character which does not require the forward or nose end thereof to be formed with a compound taper, as has been the case in most of the heretofore known types of forming taps.

It is still another object of the present invention to provide a new and improved thread swaging tap of the above character that is reversible and which may be easily reground to renew the thread forming effectiveness thereof.

It is still another object of the present invention to provide a new and improved thread swaging tap of the above character that is readily adapted to be used in forming threads in blind holes.

It is a further object of the present invention to provide a new and improved thread swaging tap that is of an extremely simple design and which is economical to commercially manufacture.

Other objects and advantages of the present invention will become apparent from the following detailed description, taken in conjunction with the accompanying drawing, wherein:

FIGURE 1 is a side elevational view of a thread swaging tap in accordance with an exemplary embodiment of the present invention;

FIGURE 2 is an enlarged side elevational view of the portion of the thread swaging tap illustrated within the circle 2 of FIGURE 1;

FIGURE 3 is an enlarged fragmentary cross-sectional view taken substantially along the line 3—3 of FIGURE 2;

FIGURE 4 is an enlarged end elevational view of the thread swaging tap illustrated in FIGURE 2, as taken in the direction of the arrow 4 thereof, and FIGURE 5 is an enlarged side elevational view of the thread swaging tap illustrated in FIGURE 2, as seen in the position which it assumes upon entering a hole in which threads are to be formed.

Referring now to the drawing, a thread swaging tap 10, in accordance with an exemplary embodiment of the present invention, is shown as comprising an elongated cylindrical hardened tool steel body having an externally threaded working section 12 and a shank section 14 that terminates at one end in a square or milled end portion 16. The threaded section 12 is formed with either a right or left hand helical forming thread, depending upon the type of threads to be formed in the associated workpiece. The section 12, with the exception of a plurality of flat surfaces or facets hereinafter to be described, is of uniform diameter and cross-section, i.e. not tapered, and accordingly, the helical thread may be formed thereon with as uniform a lead as is possible with modern thread grinding techniques.

As best illustrated in FIGURE 4, the working section 12 of the tap 10 is formed with a plurality of axially extending, circumferentially spaced sizing areas or lobes, generally designated 18, that are disposed every 72° around the tap, which areas 18 divide the periphery of the tap section 12 into five quadrants, between each pair of which is located a radial relief area, generally designated 20. It may be noted that the sizing areas 18 may be located every 90°, 120° or any other suitable circumferential distance from one another, depending upon the number of sizing areas utilized, which in turn depends upon the diameter of the hole of the workpiece in which threads are to be formed by the tap 10. It will also be noted that it is not necessary that the sizing areas 18 be equally circumferentially spaced from one another, and that for certain applications, unequal circumferential spacing of the areas 18 may be preferable. The sizing areas 18 may be considered to be defined as the portion of the tap 10 which extends radially between normal or maximum crest and root circles 22 and 24, respectively, which are concentric with the tap axis 25. It will be noted that if the crest and root circles 22 and 24 are extended, the radial relief areas 20 are set back or off-set radially inwardly somewhat therefrom. The thread depths may be considered to be the radial distance between the crest and root circles 22 and 24, and this same thread depth is maintained in the radial relief areas 20. That is to say, the crest and root lines of the radial relief areas 20 are spaced the same radial distance apart as they are in the sizing areas 18. In a preferred construction of the tap 10, the center of each of the relief areas 20 is approximately .005 inch from the inner periphery of the hole in which the threads are to be formed.

In accordance with the principles of the present invention, the forward or nose end of the tap section 12 is formed with a plurality of flat surfaces or facets, generally designated by the numeral 26. The number of flats 26 corresponds to the number of sizing areas 18, with each of the flats 26 being substantially axially aligned with one of the sizing areas 18, as best illustrated in FIGURE 4. It may be noted that it is not necessary that the facets be absolutely flat or planar, and if desired, they may be slightly curved. The flats 26 are formed at angle A (see FIGURE 3), with respect to the axis 25 of the tap 10, the angle A being determined by the clearance desired in the bottom of the tap hole. That is, if it is desired to form threads entirely to the bottom of a hole, the angle A will be selected so as to be relatively great, and conversely, if it is not critical that the threads be formed entirely to the bottom of the hole, the angle A may be somewhat less or in the order of that shown in FIGURE 3.

In a preferred construction of the present invention, the facets 26 are offset slightly circumferentially in direction of lead with respect to the adjacent of the sizing areas 18. Preferably, the amount of offset is of the order of 5°, but may be as much as 15°. With this construction, the trailing edges of the thread convolutions at the intersection of the facets are spaced radially outwardly with respect to the next advancing convolutions of the thread at the intersection of the facets 26 therewith. For example, referring to FIGURE 2, the thread at the position indicated by the numeral 28 is slightly higher than at the point on this same thread convolution designated by the numeral 30. The purpose of this construction is to eliminate the possibility of thread "shaving" as the threads are formed in the associated workpiece, thereby eliminating to very great degree, if not entirely, the possibility of chips being formed and accumulating in the bottom of the tapped hole.

In certain applications, the body section 12 of the tap 10 may be formed with axially extending vent grooves (not shown) to vent the bottom of blind holes and thereby reduce the loading on the tap 10; however, the provision of such grooves in most constructions of the tap 10 embodying the present invention is usually not necessary since the relief areas 20 are spaced sufficiently radially inwardly with respect to the sizing areas 18 to provide for proper blind hole venting.

In use, the thread swaging tap 10 of the present invention is adapted to form helical threads in a suitable prebored cylindrical hole 32 which may be formed in any suitable workpiece, for example, such as the workpiece 34 illustrated in FIGURE 5. The initial diameter of the bore 32 is preferably in the order of the dimension of 20% of the pitch plus the pitch diameter, although this may vary somewhat with the workstock material being used and the percent of finished thread desired.

As illustrated in FIGURE 4, the nose end of the tap 10 is preferably formed with a beveled or chamfered edge which removes the plurality of corners defined between the adjacent sides of the facets 26. These removed corners are generally radially aligned with the relief areas 20 and are generally designated by the numeral 36. By virtue of the facets 26 and aforedescribed chamfered corners 36, the nose end of the tap 10 may be initially recessed slightly within the open end of the bore 32, as best illustrated in FIGURE 5. Upon proper rotation of the tap 10, the sizing areas 18 will successively engage the periphery of the bore 32, the relief areas 20 being spaced slightly radially inwardly from the periphery of the bore 32 to reduce the drag or resistance to rotation of the tap 10, thus reducing the torque loading applied thereto. It will be seen that the threads are formed around the periphery of the bore 32 entirely through the plastic flow of material between the crests of the threads on the tap 10 so that there are no chips formed during the threading operation.

A particular feature of the present invention resides in the fact that the facets 26 permit the nose of the tap 10 to be initially received within the open end of the bore 32 without requiring that the nose end of the tap 10 be beveled or tapered beyond the first thread, as has been the case with swaging taps heretofore known and used. Accordingly, the tap 10 may be manufactured considerably cheaper than such known swaging taps since it is not necessary to form the leading end of the tap with a compound curvature. Another important feature of the tap 10 resides in the fact that when the nose end becomes slightly worn, it is only necessary to regrind the facets 26, as with a suitable grinding machine, to recondition the tap 10. This regrinding may be accomplished as many times as desired, resulting in a single tap being able to thread a substantially greater number of holes than has been possible with swaging taps heretofore known. It will be noted that certain types of thread forming taps have the threads extending along the entire lengths thereof so that in the event it is desired to use both ends of the tap for threading holes, it is only necessary to grind the facets 26 on the reverse end thereof. This, of course, was not economically feasible with taps which require the working ends thereof to be tapered due to the expensive grinding operations involved in forming the tapered end portions thereof.

While it will be apparent that the exemplary embodiment illustrated herein is well calculated to fulfill the objects above stated, it will be appreciated that thread swaging tap 10 of the present invention is susceptible to modification, variation and change without departing from the proper scope or fair meaning of the subjoined claims.

What is claimed is:
1. A thread swaging tap comprising,
a shank section,
a body section extending longitudinally from said shank section,
a helical thread formed on said body section having a plurality of circumferentially spaced axially extend- ing sizing areas separated by an equal number of axially extending circumferentially spaced relief areas offset radially inwardly from said sizing areas, and a plurality of facets on one end of said body section, each of said facets being formed at a preselected angle with respect to the axis of said body section and being circumferentially arranged around said body section in a preselected circumferential relation with respect to said sizing areas.

2. The invention as set forth in claim 1 wherein the number of said facets is proportional to the number of said sizing areas.

3. The invention as set forth in claim 1 wherein each of said facets is substantially axially aligned with one of said sizing areas.

4. The invention as set forth in claim 3 wherein the center of each of said facets is circumferentially offset a predetermined amount with respect to the adjacent of said sizing areas.

5. The invention as set forth in claim 4 wherein the center of said facets are circumferentially offset up to 15° in the direction of the thread lead with respect to the adjacent of said sizing areas.

6. The invention as set forth in claim 1 wherein the portions of said facets adjacent said one end of the tap are inclined toward said axis of said body section.

7. The invention as set forth in claim 1 wherein said facets are formed in said body portion so as to intersect a predetermined number of convolutions of said thread, the trailing edges of the thread convolutions at the intersection of the facets therewith being spaced radially outwardly with respect to the next advancing convolution of the thread at the intersection of the facets therewith.

References Cited
UNITED STATES PATENTS

| | | | |
|---|---|---|---|
| 3,218,656 | 11/1965 | Reiland | 85—47 XR |
| 3,295,154 | 1/1967 | Watson et al. | 10—152 XR |

FRANCIS S. HUSAR, *Primary Examiner.*